UNITED STATES PATENT OFFICE.

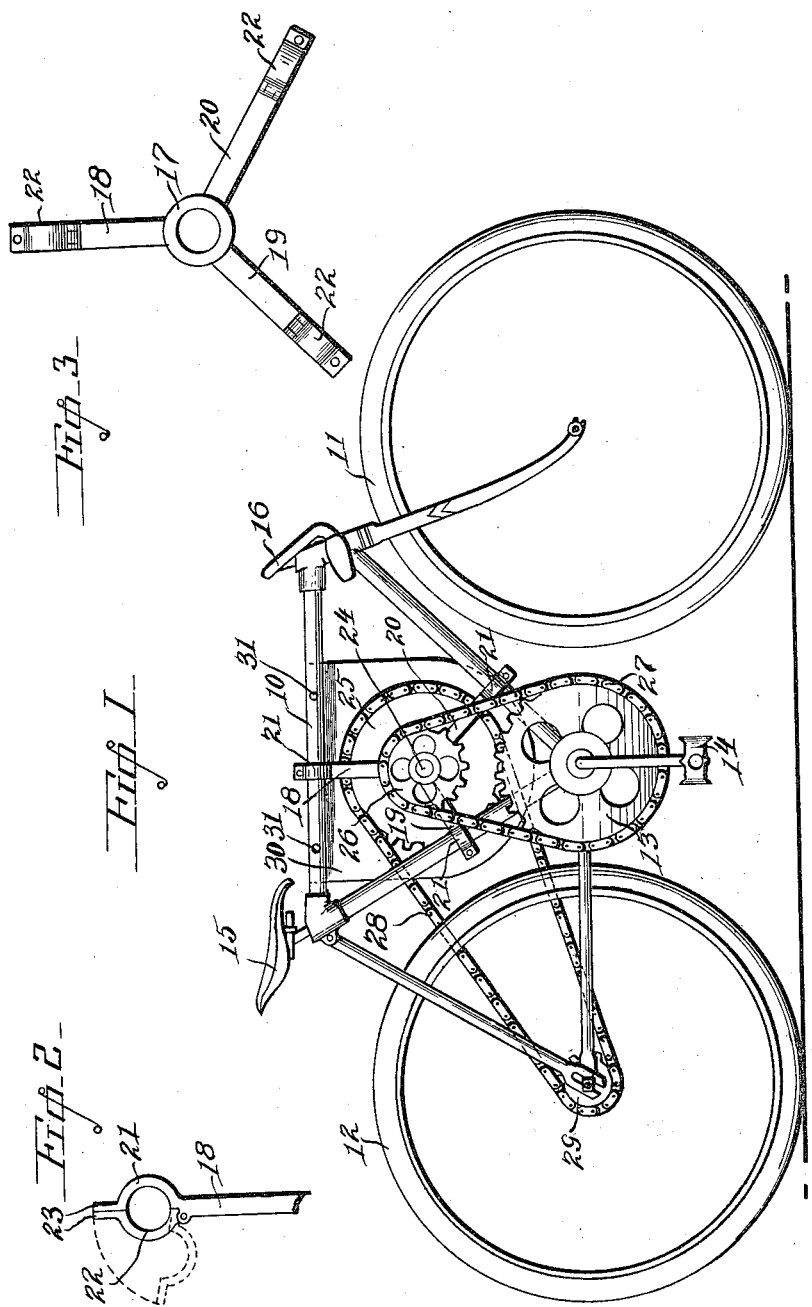

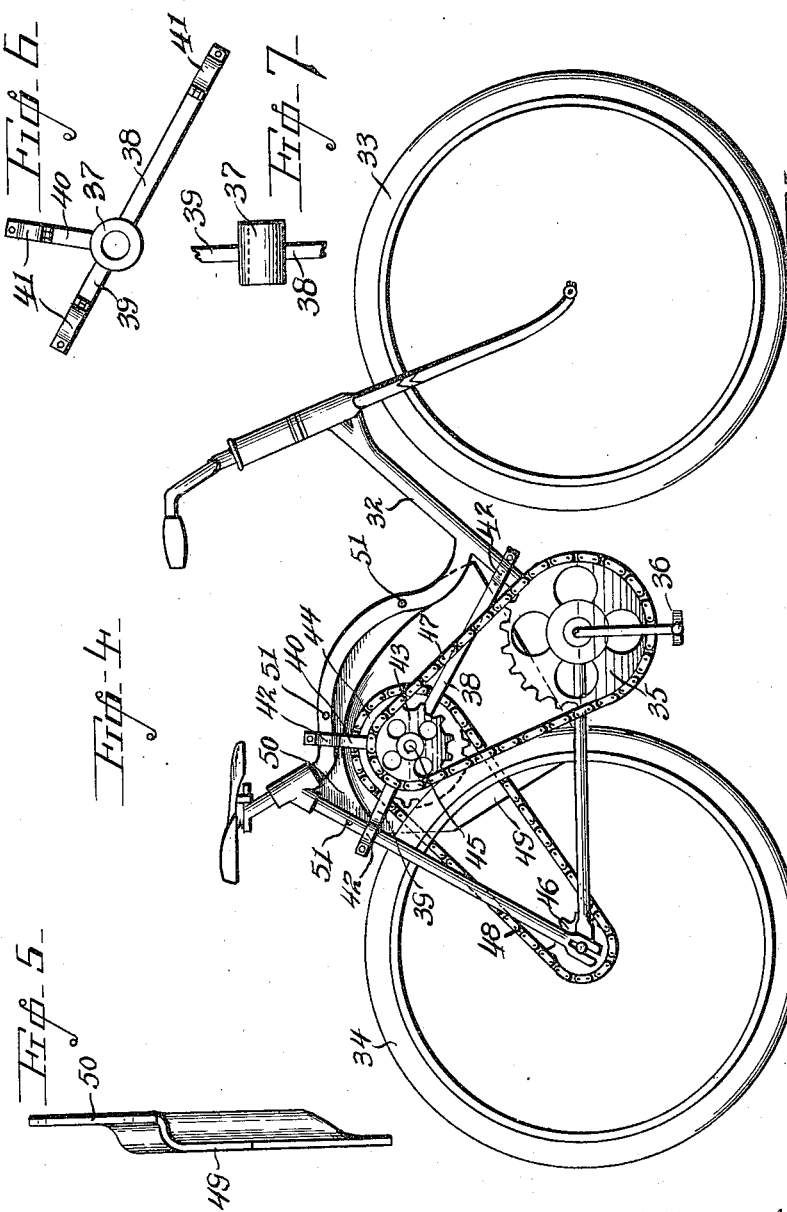

THOMAS J. CRIBBS, OF CLEARWATER, FLORIDA.

BICYCLE TRANSMISSION.

1,154,292.  Specification of Letters Patent. Patented Sept. 21, 1915.

Application filed December 17, 1913. Serial No. 807,340.

*To all whom it may concern:*

Be it known that I, THOMAS J. CRIBBS, citizen of the United States, residing at Clearwater, in the county of Pinellas and State of Florida, have invented certain new and useful Improvements in Bicycle Transmission, of which the following is a specification.

This invention relates to an improved bicycle, and the principal object of the invention is to provide improved means for propelling the rear wheel very rapidly.

Another object of the invention is to provide an attachment which is so constructed that it may be readily connected with bicycles of the usual construction.

Another object of the invention is to so construct the attachment that it may be easily and quickly put in place and removed, but at the same time to so construct the device that it will be very securely held in place when connected with the bicycle.

Another object of the invention is to provide an improved guard which will prevent the sprocket wheel and chains from tearing or soiling the clothes of the rider.

This invention is illustrated in the accompanying drawings wherein—

Figure 1 shows a man's bicycle provided with the improved driving mechanism, the bicycle being shown in elevation; Fig. 2 is a fragmentary view of one of the arms of the bracket which is secured to the bicycle frame; Fig. 3 is a view in elevation of the bearing bracket forming part of this invention; Fig. 4 is a view similar to Fig. 1 showing the attachment connected with a woman's bicycle; Fig. 5 is an end view of the guard used in Fig. 4; Fig. 6 is an elevation of the bracket used in Fig. 4; Fig. 7 is a view of the bearing forming a part of the bracket shown in Fig. 6.

Referring to Figs. 1, 2, and 3 it will be seen that this attachment may be used in connection with a man's bicycle, which bicycle is provided with a frame 10 and supported by the wheels 11 and 12 and provided with the usual sprocket wheel 13 which is rotated by the pedals 14. The usual saddle 15 and handle bars 16 are also provided. It will thus be seen that the bicycle is of the usual construction and does not have to be provided with any special construction in order to permit the attachment to be put in place.

The bracket which is in the form of a journal bracket comprises the bearing 17 from which there extend the arms 18, 19, and 20. Each of these arms has its end portion formed into a clamping section 21 which fits about one of the tubes forming the frame
10 so that the journal bracket may be removably secured to the frame by means of the hinged leaves 22. These leaves 22 are hinged to the arms as shown in Fig. 3 and are removably held in a closed position by any
suitable means passing through the lip 23 of
the clamp sections 21 and leaves 22.

A shaft 24 is journaled in the bearing 17 and carries the relatively large and small sprocket wheels 25 and 26 upon its opposite end portions. The small sprocket wheel 26 is positioned above the driving sprocket wheel 13 and is connected with this sprocket wheel 13 by means of a sprocket chain 27.
A sprocket chain 28 connects the large sprocket wheel 25 with the small sprocket wheel 29 carried by the rear wheel 12. It will thus be seen that when the sprocket wheel 13 is rotated by means of the pedal that rotary motion will be transmitted to
the rear wheel 12 from the sprocket wheel
13 by means of the sprocket wheels 25 and 26 and sprocket chains 27 and 28. It will also be noted that the speed of the rear wheel will be a great deal increased due to
the fact that the sprocket wheel 26 is smaller
than the sprocket wheel 13 and the sprocket wheel 29 is very much smaller than the sprocket wheel 25. A guard plate 30 is secured to the cross bar of the frame 10 by
suitable means as shown at 31 and prevents
danger of the rider's clothes catching between the sprocket wheels 25 and 26 and sprocket chains 27 and 28.

In Figs. 4, 5, 6, and 7 the device has been
shown applied to a woman's bicycle. In
this form the device is constructed in a similar manner to the form shown in Fig. 1. The frame 32 which is supported by the wheels 33 and 34 is similar in construction
to the frames of bicycles now on the market
and is provided with the sprocket wheel 35 which is rotated by the pedals 36. The journal bracket is provided with a bearing 37 which has arms 38, 39, and 40 extending
therefrom, the arms 38 and 39 extending in
alinement and the arm 40 extending at an angle to the arms 38 and 39. This bracket is similar in construction to the bracket shown in Fig. 39 with the exception of the
arms extending from the bearings at different angles, this being necessary so that the journal bracket may be connected with the frame as shown in Fig. 4. The arms of this bracket are secured to the frame in the same manner as the one shown in Fig. 3 by means of securing leaves 41 which coöperate with clamp sections 42. Sprockets 43 and 44 are carried by the shaft 45 journaled in the bearings 37 and are connected with the sprocket wheels 35 and 46 by means of the sprocket chains 47 and 48. The shield 49 which is used in this form is larger than the one shown in Fig. 1 to prevent a woman's skirts from being torn and is bent to form a flange 50 through which the securing devices 51 are passed to connect the guard with the bicycle frame.

The operation of both of these forms is the same. In ordinary circumstances the rear wheel would not be in the position shown in Figs. 1 and 4 but would be taken from the frame and replaced in reversed position with the axle turned end for end so that the sprocket wheel carried by the rear wheel will be in alinement with the driving sprocket and thus permit the sprocket chain to pass from the driving sprocket to the sprocket of the rear wheel.

If it is desired to put the attachment in place, the rear wheel will be taken from the frame and replaced in to the position shown in Figs. 1 and 4 thus moving its sprocket out of alinement with the sprocket 13 and after the journal bracket has been put in place and secured to the frame, the sprocket chains will be passed around the proper sprocket wheels as shown. The guard can then be put in place and the bicycle is ready for use. It will thus be seen that this device can be very quickly put in place and that when put in place, it will be very securely held in position. It should be noted that by having the arms of the journal bracket extending from the bearing at the angles shown, the bracket will be securely held in position and prevented from moving upon the tubes which form the frame. The sprocket chains will therefore be prevented from working loose.

What is claimed is:

1. In a bicycle a frame a rear wheel carried by said frame, a sprocket wheel carried by said rear wheel, a driving sprocket carried by said frame, a journal bracket carried by said frame, said journal bracket comprising a bearing, arms extending from said bearing and having their end portions provided with clamp sections engaging said frame, securing leaves hinged to said arms and coöperating with said clamp sections to secure said journal bracket to said frame, a shaft journaled in said bearing, sprocket wheels carried by said shaft, a sprocket chain connecting said driving sprocket with one of the sprocket wheels of said shaft, and a sprocket chain connecting the remaining sprocket wheel of said shaft with the sprocket wheel of said rear wheel.

2. An attachment for a bicycle comprising a journal bracket including a bearing sleeve, arms extending from said sleeve and having their end portions formed into clamp sections, securing leaves hinged to the end portions of said arms and coöperating with the clamp sections of said arms, a shaft journaled in said bearing, and sprocket wheels carried by said shaft.

3. An attachment for a bicycle comprising a journal bracket including a bearing sleeve, arms extending from said sleeve having their end portions provided with clamp sections, securing leaves carried by said arms and coöperating with said clamp sections, a shaft journaled in said bearing, means carried by said shaft for permitting said shaft to be rotated, and means for permitting rotary motion to be transmitted from said shaft.

In testimony whereof I affix my signature in presence of two witnesses.

THOMAS J. CRIBBS.

Witnesses:
A. R. BRITTLE,
R. H. PADGETT.